United States Patent
Makkiya et al.

(10) Patent No.: US 10,547,502 B2
(45) Date of Patent: Jan. 28, 2020

(54) VEHICLE COMMUNICATIONS

(71) Applicant: Ford Global Technologies, LLC, Dearborn, MI (US)

(72) Inventors: Aziz Makkiya, Troy, MI (US); Tony Zakaria, Dearborn, MI (US); Rajesh Balaji Vijayan, Dearborn Heights, MI (US); Allan Miramonti, Westland, MI (US); John Naum Vangelov, South Lyon, MI (US); Ritesh Pandya, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 15/674,217

(22) Filed: Aug. 10, 2017

(65) Prior Publication Data
US 2019/0052522 A1 Feb. 14, 2019

(51) Int. Cl.
*H04L 12/24* (2006.01)
*G07C 5/08* (2006.01)
*H04W 4/44* (2018.01)
*G07C 5/00* (2006.01)
*H04L 29/08* (2006.01)
*H04W 84/04* (2009.01)

(52) U.S. Cl.
CPC ............ *H04L 41/069* (2013.01); *G07C 5/008* (2013.01); *G07C 5/085* (2013.01); *G07C 5/0808* (2013.01); *G07C 5/0841* (2013.01); *H04L 41/0677* (2013.01); *H04L 67/12* (2013.01); *H04W 4/44* (2018.02); *H04W 84/042* (2013.01)

(58) Field of Classification Search
CPC ... H04L 41/0677; H04L 41/069; H04L 67/12; G07C 5/008; G07C 5/0808; G07C 5/0841; G07C 5/085
See application file for complete search history.

(56) References Cited

U.S. PATENT DOCUMENTS

| | | | |
|---|---|---|---|
| 2012/0053778 A1 | 3/2012 | Colvin et al. | |
| 2014/0005880 A1* | 1/2014 | Guenkova-Luy | H04L 41/069 701/31.4 |
| 2014/0195071 A1 | 7/2014 | Hunt | |
| 2016/0258766 A1* | 9/2016 | Felemban | G08G 1/096741 |
| 2016/0315998 A1* | 10/2016 | Johnson | G06N 5/04 |

FOREIGN PATENT DOCUMENTS

| | | |
|---|---|---|
| EP | 2680534 A1 | 1/2014 |
| GB | 2501291 A | 10/2013 |

\* cited by examiner

*Primary Examiner* — Magdi Elhag
(74) *Attorney, Agent, or Firm* — Frank Lollo; Brooks Kushman P.C.

(57) ABSTRACT

A vehicle system includes a telematics control unit (TCU) coupled to a plurality of vehicle controllers. The TCU is configured to periodically record in a log wireless activity data relating to an authentication, attachment, signaling, detachment, and handover procedure of the TCU to provide one or more remote vehicle services. The TCU is further configured to, responsive to detecting a cellular malfunction from the logged data, wirelessly transmit at least a portion of the log that corresponds to the cellular malfunction offboard the vehicle for a remote server configured to diagnose operation of the TCU.

15 Claims, 2 Drawing Sheets

VEHICLE COMMUNICATIONS

TECHNICAL FIELD

The present disclosure relates to systems and methods for monitoring and resolving vehicle communication malfunctions.

BACKGROUND

The importance of stable vehicle communication has grown as vehicles have become increasingly advanced. Systems of a vehicle communicate large amounts of data with one another to coordinate and ensure proper operation of the vehicle. Moreover, given the mobile nature of vehicles, wireless vehicle communications enable valuable features that otherwise would not be available. A need therefore exists to efficiently monitor and resolve vehicle communication malfunctions to ensure optimal functioning of a vehicle.

SUMMARY

The following summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

In one exemplary embodiment, a vehicle system includes a telematics control unit (TCU) configured to periodically record in a log wireless activity data relating to an authentication, attachment, signaling, detachment, and handover procedure of the TCU to provide one or more remote vehicle services. The TCU is further configured to, responsive to detecting a cellular malfunction from the logged data, wirelessly transmit at least a portion of the log that corresponds to the cellular malfunction offboard the vehicle for a remote diagnostic server.

In a further exemplary embodiment, a method includes, by a TCU of a vehicle, periodically recording in a log wireless activity data relating to an authentication, attachment, signaling, detachment, and handover procedure of the TCU to provide one or more remote vehicle services. Responsive to detecting a cellular malfunction from the log, the method further includes, by the TCU, wirelessly transmitting at least a portion of the log that corresponds to the cellular malfunction offboard the vehicle for a remote diagnostic server.

In another exemplary embodiment, a diagnostic server includes a processor geographically remote from a vehicle including a TCU. The TCU is configured to generate a first log specific to wireless activity of the TCU and a second log specific to component malfunctions of the TCU. The processor is configured to transmit a request for the first log, where the first log and not the second log is received by the processor responsive to the request.

DETAILED DESCRIPTION

Figure 1:
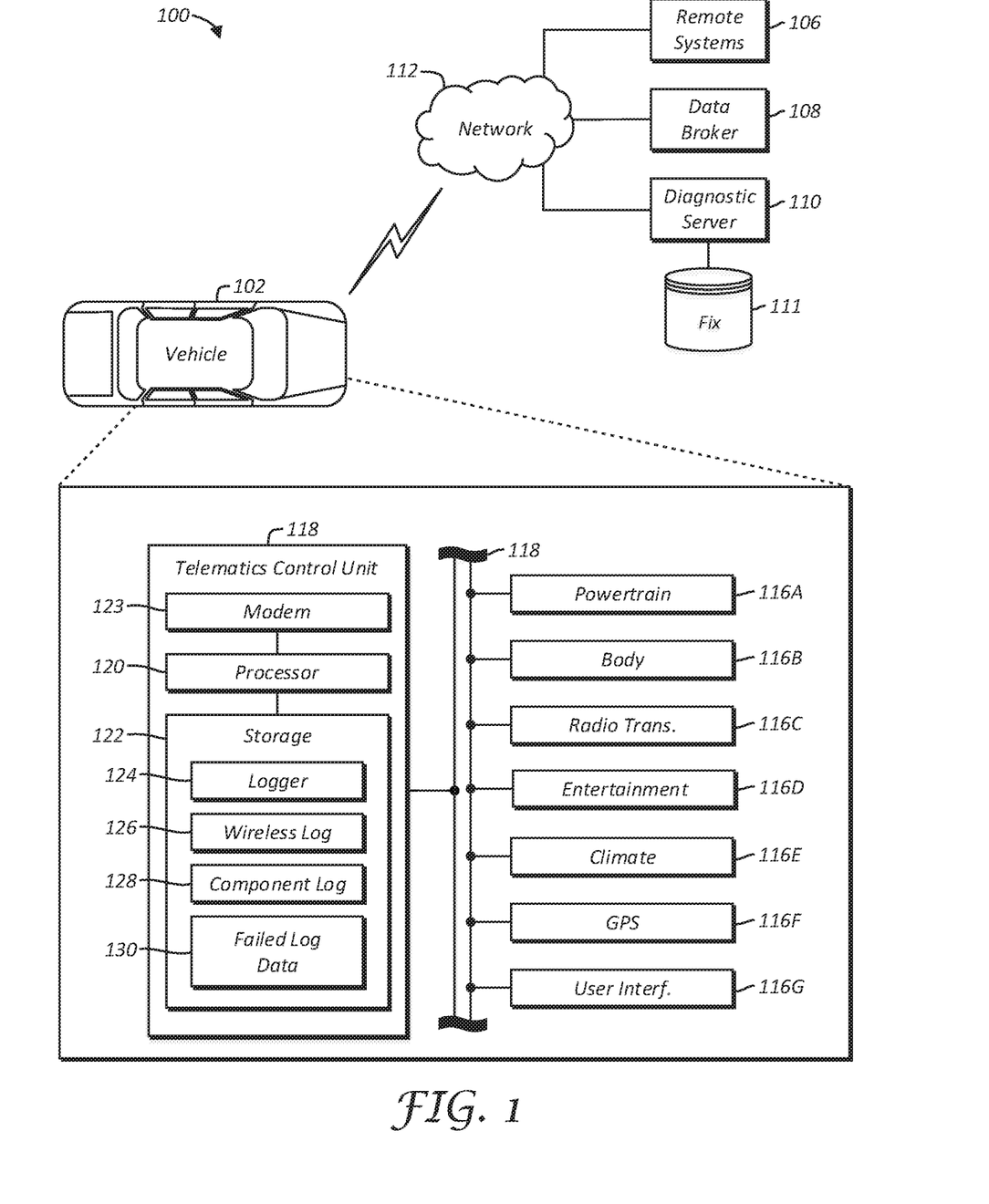
FIG. 1 is a schematic diagram illustrating a system for monitoring and resolving vehicle communication malfunctions.

FIG. 1 illustrates an exemplary system 100 for monitoring and resolving communication malfunctions of a vehicle 102. The vehicle 102 may include a telematics control unit ("TCU") 104 for wirelessly communicating with remote systems 106, a data broker 108, and a diagnostic server 110 over a network 112.

The remote systems 106 may include mobile devices and servers with which the TCU 104 may wirelessly communicate to provide remote services for the vehicle 102. For example, a user may issue a command to remote lock, unlock, or start the vehicle 102 from his or her mobile device. Upon issuance of the command, the mobile device may transmit the command over the network 112 to the TCU 104, which may then cause the vehicle 102 to implement the command. As a further example, the TCU 104 may include a global positioning system ("GPS") unit for tracking a location of the vehicle 102. Upon the vehicle 102 being involved in an accident, the TCU 104 may automatically transmit the location of the vehicle 102 to emergency personnel via the network 112. In another example, the TCU 104 of the vehicle 102 may communicate location, diagnostic, and driver behavior data to a remote fleet management system, which may then enable a manager to manage the vehicle 102 and the driver based thereon.

TCU malfunctions may occur that prevent the vehicle 102 from receiving and transmitting data for remote services, such as those mentioned above. For example, the components (e.g., hardware or software) of the TCU 104 may malfunction (e.g., software issue such as getting stuck in a loop, hardware issue such as a bad antenna), thereby preventing the TCU 104 from proper operation. As a further example, a network (or cellular) malfunction may occur (e.g., problems connecting to a wireless network, little or no network connectivity), which may cause slow connection speeds or a connection error. As another example, the remote systems 106 may malfunction, which may prevent the transmission of data from and to the remote systems 106. Attempting an after-the-fact simulation of the circumstances leading to a TCU malfunction for diagnostic purposes is difficult given the passage of time and movement of the vehicle 102. For example, the cellular network circumstances (e.g., signal strength) may change as the vehicle 102 changes location. The circumstances of every TCU malfunction may also not be reproducible after the malfunction occurs. Moreover, because the source of a TCU malfunction is often unknown after the fact, to the extent that such malfunctions can be diagnosed, diagnosing the malfunction may entail a guess and check process that requires a significant utilization of resources and time.

Accordingly, rather than relying on after-the-fact simulations to diagnose TCU malfunctions, the TCU 104 may be configured to generate one or more logs relating to activities and malfunctions of the TCU 104. Upon an occurrence of a malfunction, or periodically, or on demand from the diagnostic server 110, the TCU 104 may be configured to wirelessly transmit at least a portion of the logs offboard the vehicle 102 for the diagnostic server 110, such as via the data broker 108 and a message queue telemetry transport (MQTT) protocol specifically designed for the present embodiments. The diagnostic server 110 may then determine, or enable a user to determine, whether a TCU malfunction occurred because of a malfunction of a component of the TCU 104, or because of a network malfunction, based on the logs, and debug the malfunction accordingly.

The vehicle 102 may include various types of automobiles, a crossover utility vehicle (CUV), a sport utility vehicle (SUV), a truck, a recreational vehicle (RV), a boat, a plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the operating characteristics of the vehicle 102 may correspondingly vary. As some other possibilities, the vehicle 102 may have different characteristics with respect to passenger capacity, towing ability and capacity, and storage volume.

The vehicle 102 may include various hardware and software components, such as, but not limed to, one or more vehicle controllers 116 (represented as discrete controllers 116A through 116G in the system 100). The controllers 116 may be configured to monitor and manage various functions of the vehicle 102 under the power of the vehicle battery and/or drivetrain. The controllers 116 may include one or more processors (e.g., microprocessors) configured to execute firmware or software programs stored on one or more storage devices of the controllers 116. While the controllers 116 are illustrated as separate components, the vehicle controllers 116 may share physical hardware, firmware, and/or software, such that the functionality from multiple controllers 116 may be integrated into a single controller 116, and that the functionality of various such controllers 116 may be distributed across a plurality of controllers 116.

The vehicle controllers 116 may, for example, include, but are not limited to, a powertrain controller 116A configured to manage engine operating components, a body controller 116B configured to manage various power control functions such as exterior lighting, interior lighting, keyless entry, remote start, and point of access status verification, a radio transceiver controller 116C configured to communicate with key fobs, mobile devices, or other local vehicle 102 devices, an entertainment controller 116D configured to support voice command and BLUETOOTH interfaces with the driver and driver carry-on devices, a climate control management controller 116E configured to monitor and manage heating and cooling system components (e.g., compressor clutch, blower fan, temperature sensors, etc.), a global positioning system (GPS) controller 116F configured to provide vehicle location information, and a user interface (HMI) controller 116G configured to receive user input via various buttons or other controls, as well as provide vehicle status information to a driver.

The vehicle bus 118 may include various methods of communication available between the vehicle controllers 116, as well as between the TCU 104 and the vehicle controllers 116. The TCU 104 may thus be coupled to the controllers and may communicate data (e.g., diagnostic information) from the controllers 116 to the remote systems 106, and may transmit data or commands (e.g., a remote start command) from the remote systems 106 to the controllers 116, via the vehicle bus 118. The vehicle bus 118 may include one or more of a vehicle controller area network (CAN), an Ethernet network, and/or a media oriented system transfer (MOST) network.

The TCU 104 may include a processor 120, storage 122, and a modem 123. The processor 120 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the storage 122. The storage 122 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, mass storage memory devices such as a hard drive, optical drive, tape drive, and non-volatile solid state device, and any other device capable of storing information. The storage 22 may be configured to store operating systems and applications executed by the processor 120, and databases of information accessed by the processor 120.

The processor 120 may be configured to execute firmware or software programs, such as a logger 124, stored on the storage 122 of the TCU 104. The TCU 104 may further include network hardware configured to facilitate communication between the vehicle controllers 116, and to facilitate communication between the vehicle 102 and other devices of the system 100 via the network 112. For example, the modem 123 of the TCU 104 may provide wireless connectively to the network 112, and may thereby enable the TCU 104 to wirelessly transmit vehicle operational data from the vehicle controllers 116 to one or more remote systems 106. Similarly, the modem 123 may enable the TCU 104 to transmit logged data indicative of TCU network activity and/or TCU component malfunctions to the data broker 108 and the diagnostic server 110. The network 112 may include one or more interconnected communication networks such as the Internet, a wide area network, a cable television distributed network, a satellite link network, a local area network, a wide area network, and a telephone network. The TCU 104 may also be configured to communicate via one or more Bluetooth, Wi-Fi, and wired USB network connections, and may facilitate data transmission between the vehicle 102 and the network 112 via a mobile device (not shown) located in or paired with the vehicle 102.

Upon power-up or starting of an engine of the vehicle 102, the logger 124 may be configured to log malfunction data for the TCU 104. Specifically, the logger 124 may be configured to record in a log wireless activity data that is indicative of network malfunctions, such as a network connectivity issue. The wireless activity data may indicate one or more network malfunctions (such as a cellular network malfunction) occurring when the TCU 104 provides one or more remote services for the vehicle 102, such as downloading or receiving data, uploading or transmitting data, and connection processes and procedures performed by or related to operation of the TCU 104. The connection processes and procedures may include protocol signaling procedures performed by the TCU 104 when connecting and communicating via the network 112, such as signaling, authentication, attachment, detachment, and handover activities of the TCU 104. In other words, the logged wireless activity data may identify a malfunction relating to TCU 104 activities, including an authentication, attachment, signaling, detachment, and handover procedure performed by the TCU 104 to wirelessly transmit data from the vehicle controllers 116 to a remote system 106, and/or to receive data or commands for the vehicle controllers 116 from a remote system 106.

Regarding the aforementioned protocol signaling procedures, signaling may be performed to determine whether the TCU 104 is located in an area with adequate network or cellular coverage, as opposed to an area with little or no coverage (e.g., an area of −113 db or less). When adequate network or cellular coverage is available, authentication may be performed to authenticate the TCU 104 with a network or cellular provider, and the TCU 104 may receive either an ACCEPT or REJECT message from the provider in response to the authentication. Attachment may be performed whenever a session is initiated between the TCU 104 and the network 112, such as via a data attach request (e.g., a PDP attach request), and the TCU 104 may receive either an ACCEPT or REJECT message responsive to the request. Detachment may be performed when a session between the TCU 104 and the network 112 ends, in which case the TCU 104 may receive a disconnect message. Handover may be performed when the vehicle 102 is in motion, and the TCU 104 needs to change its cellular or network connection from one access point or cellular tower to another access point or cellular tower.

The logger 124 may be configured to periodically or continuously monitor for malfunctions relating to wireless activities performed by the TCU 104, such as errors occurring during the connection processes and procedures described above, to include as part of the logged wireless activity data. To this end, the logger 124 may be configured to periodically or continuously collect and temporarily store wireless activity data related to wireless activity of the TCU 104, such as in a main memory of the TCU 104 (e.g., RAM). The wireless activity data may include several periodically recorded entries that each detail one or more wireless activities being performed by the TCU 104 at a given time. Each entry may include a timestamp indicating when the data for the entry was collected, a current location of the vehicle 102 when the data for the entry was collected, current network coverage of the vehicle 102 when the data for the entry was collected, and/or whether the TCU 104 was engaging in any wireless activities when the data entry was collected. For each wireless activity, the entry may also include a start time of the wireless activity, an end time of the wireless activity, an elapsed time for the wireless activity, a speed for the selected activity, a status of the wireless activity (e.g., pending, idle), a result of the wireless activity (e.g., success, failure).

In response to detecting a network malfunction, such as slow connection speeds, deficient network coverage, failure to connect to an available network, and/or failure of one of the aforementioned wireless activities, from the temporarily stored data, the logger 124 may be configured to record the identified malfunction in a log, such as a wireless log 126 specific to storing wireless activity data and/or network-related malfunctions of the TCU 104. To this end, the logger 124 may also record in the log at least a portion of the wireless activity data collected prior to the malfunction. For example, the log may include the identified network malfunction, details corresponding to the wireless activity of the TCU 104 corresponding to the network malfunction as included in the wireless activity data, and/or other wireless activity data corresponding collected prior to malfunction. Specifically, the log may also include wireless activity data associated with a timestamp that falls within a predetermined time period immediately prior to the network malfunction. Unlike the temporary storage, the log may be stored in a persistent storage device, such as a mass storage device of storage 22, and may include one or more log files that include at least a portion (e.g., the aforementioned parts) of the wireless activity data.

Alternatively, the logger 124 may be configured to periodically or continuously record all wireless activity data in the log, such as the wireless log 126, and such as as the wireless activity data is collected, irrespective of whether a cellular malfunction occurs. In this case, upon detection of the network malfunction, the logged data may include wireless activity data of the TCU 104 that is associated with the network malfunction, and wireless activity data of the TCU 104 that is not associated with the cellular malfunction. In this case, prior to transmitting the log offboard the vehicle 102, the logger 124 may be configured to remove form the log (or at least the transmitted log) and/or discard at least a portion of the wireless activity data that is not associated with the cellular malfunction. For example, the logger 124 may be configured to remove form the log (or at least the transmitted log) and/or discard all the wireless activity data that is not associated with network malfunction, or the wireless activity data associated with a timestamp that does not fall within the predefined period immediately preceding the network malfunction.

The logger 124 may also be configured to collect data related to network activity and/or operation of the TCU 104, such as a status of components of the TCU 104 (e.g., component is operating normally, the values of parameters of the components, a component is reporting an abnormal operating condition) after the cellular malfunction is detected for a predetermined time (e.g., five seconds' worth) or to a predetermined data size, and may record this data in the log in association with the malfunction. In this way, the log may include data identifying the cellular malfunction, data relating to network activity and a condition of the TCU 104 leading to the malfunction, and data relating to a condition of the TCU 104 and/or network activity after the malfunction is detected. Network activity data of the TCU 104 that is collected by the logger 124 and does not correspond to a malfunction may be discarded without ever being logged and/or within every being transmitted offboard the vehicle 102.

The logger 124 may also be configured to record TCU component malfunctions indicative of a component (e.g., hardware, software) malfunction of the of the TCU 104 in a log, such as the component log 128 in storage 122, in response to a component malfunction of the TCU 104. The component log 128 may be specific to TCU component malfunction data, and may include one or more log files included in a persistent storage device of storage 22, such as a mass storage memory device. Component malfunctions logged by the TCU 104 may include diagnostic trouble codes (DTC's), firmware over-the-air (FOTA) failures, input-output (I/O) faults, global positioning system (GPS) faults, MQTT message broker connection issues, and memory read/write failures. The logger 124 may be configured to record TCU component malfunctions in the log on an event basis (e.g., in response to receiving a DTC).

As previously noted, the logger 124 may store the logged TCU network activity data in a wireless log 126 of the storage 122, and may store the logged TCU component malfunction data in a component log 128 of the storage 122. Alternatively, the logger 124 may store the logged network activity data and logged component malfunction data in a single log of the storage 122, or may store each entry of logged network activity data and logged component malfunction data in a separate log of the storage 122.

The TCU 104 may include non-volatile memory dedicated to storing the logs compiled by the logger 124. Specifically, the storage 122 may include non-volatile memory, and a portion of the non-volatile memory may be dedicated to storing the logs. In some embodiments, the portion may be at most 2 MB. The TCU 104 and/or logger 124 may be configured to utilize a combination of the allocated non-volatile memory (e.g., flash memory) and RAM included in the storage 122 to efficiently store and transmit the logs. For example, the TCU 104 and/or logger 124 may implement a swap algorithm, which may entail storing the logs or logged data in RAM, and thereafter moving it to flash, such as if the logger 124 is unable to successfully transmit the logged data to the diagnostic server 110 or the data broker 108. Moreover, the logger 124 may compile and store the logs in the non-volatile memory periodically, such as from the data stored in RAM, and may format the stored logs in the UTF-8 plaintext format. When logged, data may be divided into smaller data chunks, such as data chunks of 128 bytes each. In certain embodiments, a maximum of sixteen data chunks may be placed in the non-volatile memory for the stored logs.

In response to a TCU malfunction (e.g., a network malfunction or a component malfunction) occurring, being detected, and being recorded in a log, the logger 124 may be configured to cause the TCU 104 to wirelessly transmit the logged data offboard the vehicle 102 for the diagnostic server 110. For example, the logger 124 may be configured, responsive to a network malfunction, to wirelessly transmit the logged network activity data, which may be stored in the wireless log 126, offboard the vehicle 102 for the diagnostic server 110. The logger 124 may likewise be configured, responsive to a TCU component malfunction, to wirelessly transmit the logged component malfunction data, which may be stored in the component log 128, offboard the vehicle 102 for the diagnostic server 110.

As a further example, responsive to either a TCU component malfunction or a network malfunction, the logger 124 may be configured to transmit all or at least a portion of the logged TCU component malfunction data, and all or at least a portion of the logged wireless activity data offboard the vehicle 102. In this way, the diagnostic server 110 may cross reference the network activity of the TCU 104 around when a TCU component malfunction occurred, and may cross reference TCU component malfunction data around when a network malfunction occurs. For example, responsive to a component malfunction, the logger 124 may be configured to transmit all of the logged component malfunction data, and logged wireless activity data associated with a timestamp that falls within a predefined time period immediately preceding and/or a predefined timer period immediately following the time of the component malfunction. To this end, responsive to the component malfunction, the logger 124 may be configured to identify data in logged wireless activity data that is associated with a timestamp within a predefined time period immediately preceding and/or a predefined timer period immediately following the component malfunction, and transmit the identified data and the logged component malfunction data. Similarly, in the case of a network malfunction, the logger 124 may be configured to transmit all of the logged network activity data and the logged component malfunction data associated with a time within a predefined time period before and/or a predefined time period after the time of the component malfunction. Any logged data filtered out by the above process (e.g., logged data associated with a timestamp outside of the aforementioned predefined time periods) may be discarded without being timestamp offboard the vehicle 102 for the diagnostic server 110.

The logger 124 may further be configured to transmit one or more of the logs offboard the vehicle 102 for the diagnostic server 110 responsive to storage allocation for the logs becoming full or nearly full (e.g., 85% full, 95% full), or in response to receiving a request for a stored log from the diagnostic server 110, or periodically.

When transmitting logged data offboard the vehicle 102 for the diagnostic server 110, the logger 124 may be configured to split the logged data into smaller data chunks for transmission (if not split already), such as data chunks of 128 kilobytes each. The logger 124 may also generate a header identifying the total number of data chunks that make up a transmitted log or a transmission, and attach the header to each of the data chunks. The header may enable the diagnostic server 110 and/or data broker 108 to understand and decode a message transmission when the chunks are received by reading the header of each data chunk and re-compiling the logs based thereon. Prior to transmitting logs, the logger 124 may encrypt the logs to ensure greater security.

Responsive to a successful transmission of logged data to the diagnostic server 110 or the data broker 108, the logger 124 may receive an acknowledgement message. In response, the logger 124 may remove the transmitted logged data from storage 122. In the event of a transmission failure, however, such as because of a wireless connection issue, because the communication channel (e.g., MQTT channel) is busy, or because an acknowledgement is not received for the transmission from the data broker 108 or the diagnostic server 110, the logger 124 and/or the TCU 104 may maintain the logged data, such as by moving the data to non-volatile memory and/or inserting the logged data into a cache for failed transmission log data 130. The cache may include each instance of logged data, or each log file, that was unsuccessfully received by the data broker 108 or the diagnostic server 110. Thereafter, the logger 124 may implement a retry mechanism. For example, the logger 124 and/or TCU 104 may perform periodic memory checks of the cache for failed transmission log data 130, and retry transmitting the data. Additionally, or alternatively, responsive to data size of the failed transmission log data in the cache 130 equaling or exceeding a predetermined threshold (e.g., 85% or 95% of the space allocated to store the failed transmission log data), the logger 124 may be configured to automatically and wirelessly retry transmitting the failed transmission log data offboard the vehicle 102 for the diagnostic server 110.

In addition to the aforementioned advantages, embodiments described herein are designed to overcome technical challenges relating to monitoring and resolving TCU malfunctions of a vehicle 102. Optimization of available space and power utilization is a factor when designing a vehicle 102, and to that end, reliable local electronic storage is not an endless resource for monitoring and resolving TCU malfunctions. Hence, while one solution for monitoring and resolving TCU malfunctions of a vehicle 102 may entail storing TCU malfunction logs locally until a laptop or other device is directly connected to the vehicle 102 to download the stored logs, such a solution may not be efficient or practical. Specifically, under this solution, as a vehicle 102 is operated, the local capacity needed to store the TCU malfunction logs and TCU activity may be massive, especially if a long interval exists between when the logs are downloaded from the vehicle 102 via the laptop. Consequently, storing TCU malfunction logs and activity until a laptop is able to directly connect to the vehicle 102 and download the logs may increase the resources consumed by the vehicle 102 to a large degree. Moreover, because data is not available to diagnose a malfunction until it is read directly from the vehicle 102 via a laptop or other hardware device in this solution, response time for diagnosing a TCU malfunction is also increased.

Thus, to minimize consumed resources and response times relating to monitoring and resolving a TCU malfunction, the logger 124 may be configured to continuously monitor for and/or log TCU malfunctions, including TCU component malfunctions and network malfunctions. If no malfunctions are detected, then no data may be logged, and any temporarily stored data may be discarded. Alternatively, data relating to network activity of the TCU 104 may be logged, and may be discarded after a period of time in which no malfunction is detected. In other words, the logger 124 may be configured to delete logged network activity data that is older than a predefined time prior to a current time based on the timestamps included in the data, thereby freeing up resources for additional data.

Alternatively, if a TCU malfunction is detected, the logger 124 may be configured to log data indicative of the malfunction (if not already logged), and possibility data relating to network activity and operational states of the TCU 104 before and/or after the malfunction. Once a malfunction is logged and detected, the logged data may be automatically sent to the diagnostic server 110, such as via the data broker 108, and thereafter removed from the storage 122 of the TCU 104. In this way, data payloads sent over the network 112 are reduced, as the logger 124 may be configured to transmit malfunction data when it is logged, rather than when data for multiple malfunctions is accumulated. The cost of the logged data on the storage resources of the vehicle 102 is also reduced, as the logged data may be transmitted upon being logged and removed from the TCU 104 once transmitted, rather than being accumulated for direct download by a laptop. Moreover, the types of data and malfunctions logged by the logger 124 may be limited (e.g., specific values, parameters, and measurements to be filtered/flagged/logged may be defined, such as via the diagnostic server 110), to further reduce the data footprint of the stored logs.

The diagnostic server 110 may be configured to diagnose operation of the TCU 104 via the received logs. The diagnostic server 110 (also the remote systems 106 and data broker 108) may include a processor, storage, and a modem or other network transceiver (not shown) like those of the TCU 104. Upon receiving the logs, the diagnostic server 110 may be configured, via its processor, to automatically store the logs in a persistent memory device, process the logs, and display the logs in an optimal format for debugging a TCU 104 malfunction. Specifically, the diagnostic server 110 may read the header from each data chunk received in a transmission, and thereby determine the total number of data chunks included in each log of the transmission. The diagnostic server 110 may utilize this information to decode the data chunks into one or more transmitted logs, and proceed to process the logs as described in more detail below.

The diagnostic server 110 may be configured to store logs from multiple TCU's 104 of multiple vehicles 102. For each TCU 104, the diagnostic server 110 may be configured to store logs received during a particular time frame, such as the past six months. The diagnostic server 110 may include a graphical user interface (GUI) for displaying the logs from one or more TCU's 104, and for customizing the information displayed by the GUI. For example, the diagnostic server 110 may enable a user to pull and display different configurations of the same stored logs by inputting dates and log content types (e.g., wireless logs or component logs). In the case of a log transmission request being initiated from the diagnostic server 110, the GUI of the diagnostic server 110 may likewise enable a user to request a particular log from the TCU 104 of a vehicle 102 via user-submitted criteria, such as input dates and identified content type. Upon receiving such a request, the TCU 104 may be configured to compile and buffer a log transmission such that the data of the log transmission satisfies of the criteria of the request.

The diagnostic server 110 may further be coupled to or include a fix database 111. The fix database 111 may include automated fixes for TCU malfunctions experienced by the TCU 104. In response to receiving logged data, such as data indicating a network connectivity malfunction or a TCU component malfunction, the diagnostic server 110 may be configured to query the fix database 111 to identify an appropriate fix for the malfunction. Thereafter, the diagnostic server 110 may transmit the fix to the TCU 104 for implementation by the TCU 104. In some embodiments, the diagnostic server 110 may be configured to dynamically determine the appropriate fix for a malfunction, such as based on one or more fix data entries included in the fix database 111. This process may be completely automatic. Additionally, or alternatively, a user may interact with the GUI of the diagnostic server 110 to select, upload, or generate a fix, and thereafter selectively transmit the fix to the TCU 104.

Like the TCU 104, the diagnostic server 110 may include a retry mechanism when requests for logs are initiated therefrom. The diagnostic server 110 may implement the retry mechanism when a network communication issue arises, or when the TCU 104 is down (e.g., in a sleep condition, switched off) such that no data is received in response to a log request sent from the diagnostic server 110.

While an exemplary system 100 is shown in FIG. 1, the example components illustrated in the Figure are not intended to be limiting. Indeed, the system 100 may have more or fewer components, and additional or alternative components and/or implementations may be used. As one non-limiting example, the logger 124 and its corresponding functionality may reside in one or more controllers 116 of the vehicle 102 other than the TCU 104.

Figure 2:
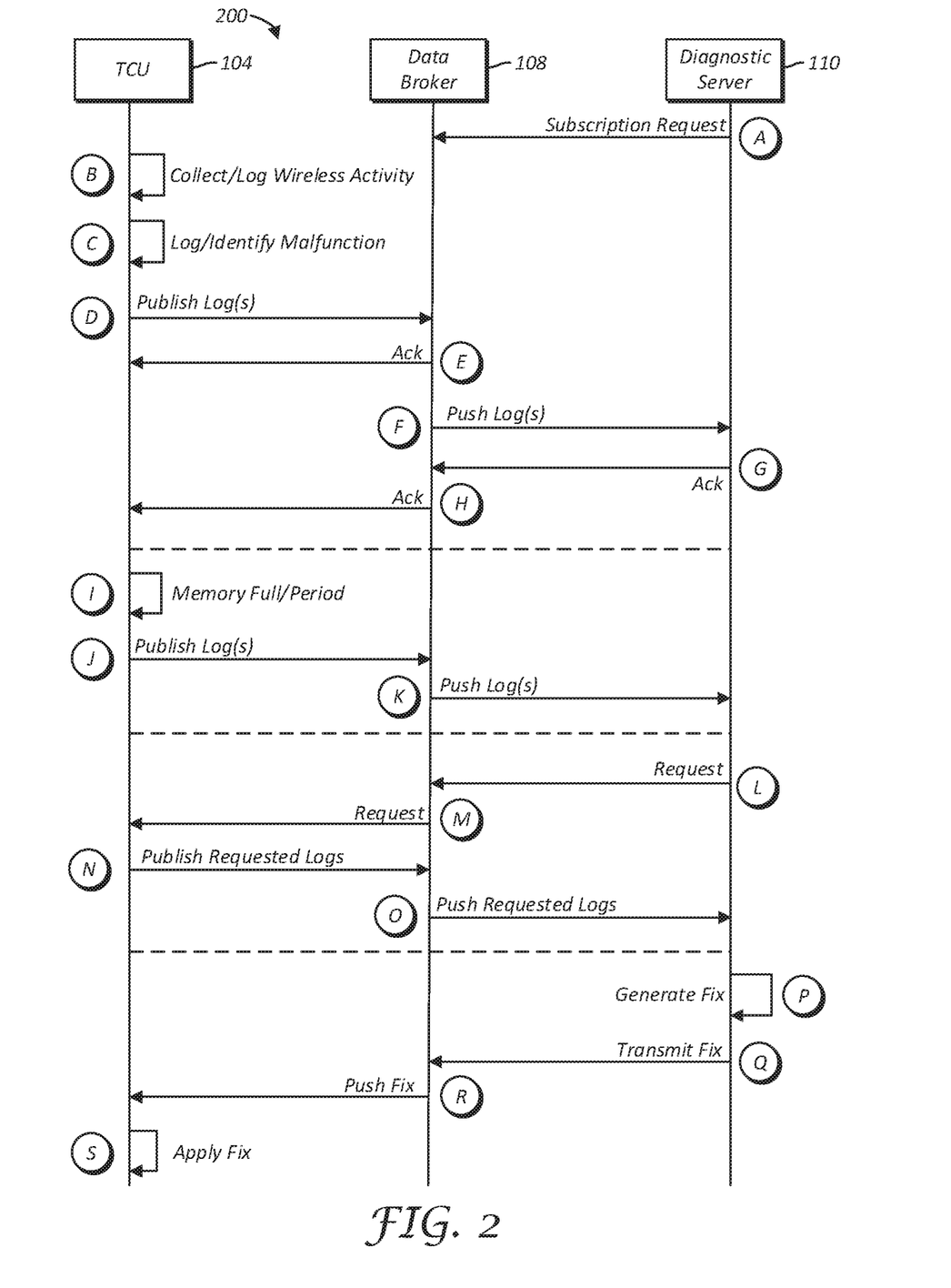
FIG. 2 is a lane diagram illustrating a process for monitoring and resolving vehicle communication malfunctions.

FIG. 2 illustrates a process 200 for monitoring, reporting, and resolving TCU malfunctions. The process 200 illustrates communication between the TCU 104 and the diagnostic server 110 via the data broker 108. The TCU 104 may establish an MQTT session with the data broker 108 to facilitate the transfer of logged data from the TCU 104 to the diagnostic server 110. Compared to HTTP or HTTPS sessions, which must be set up for each one-way communication, an MQTT session can be established for several hours (e.g., up to four hours) as a two-way communication channel, and support larger payloads upwards of 200 MB, each of which reduces system latency when transmitting logged data. Moreover, and as described in greater detail below, the data broker 108 may operate as a buffer or cache for storing messages or transmitted data, so if one of the end points (e.g., the TCU 104 or the diagnostic server 110) is unable to receive messages or data, then the data broker 108 can hold messages or data and retry transmission later. This feature may enable the transmitting component (e.g., the vehicle 102) to free up system resources sooner by deleting the transmitted data from memory before the diagnostic server 110 receives the data. In alternative embodiments, communication between the TCU 104 and the diagnostic server 110 may be direct (i.e., log transmissions from the TCU 104 are specifically addressed to the diagnostic server 110, and vice versa for log requests).

At index (A), the diagnostic server 110 may transmit a request to subscribe to one or more TCU logs of one or more TCU's 104 to the data broker 108. In this way, whenever the TCU 104 transmits (aka "publishes") a TCU logged data to the data broker 108, the data broker 108 may push the TCU logged data to any subscribers of the TCU logged data, including the diagnostic server 110. In some embodiments, the subscription request may indicate one or more specific types (aka "topics") of TCU logged data that a user desires the diagnostic server 110 to receive. For example, the subscription request may include a string, such as "TCU104/log/wireless," which may indicate a desire for the diagnostic server 110 to receive log publications by the TCU 104 that specifically relate to network malfunctions. Alternatively, the subscription request may include a string, such as "TCU104/log/TCUcomponent," which may indicate a desire to receive log publications by the TCU 104 that specifically relate to TCU component malfunctions. As a further alternative, the subscription request may indicate a desire for the diagnostic server 110 to receive all TCU log publications of the TCU 104. The specific syntax of the topics associated with data published by the TCU 104 (and by the diagnostic server 110) may be defined and coordinated between the TCU 104 and the diagnostic server 110 prior to any monitoring and transmission.

At index (B), wireless activity data of the TCU 104 may be collected and temporarily stored and/or recorded in a log. The wireless activity data may detail one or more wireless activities performed by the TCU 104 at given times. At index (C), a TCU malfunction may be identified and/or be logged. For example, a network or cellular malfunction may occur, which may prevent the TCU 104 from establishing a connection with the network 112, from the temporarily stored or logged wireless activity data. Alternatively, a component of the TCU 104 may malfunction. Responsive to detecting the TCU malfunction, the TCU 104 may record malfunction data in an appropriate log (e.g., wireless log 126, component log 128) identifying the malfunction if not already recorded in a log. In the case of a network malfunction, the TCU 104 may log network malfunction data identifying and/or detailing the network malfunction in the wireless log 126. In the case of a TCU component malfunction, the TCU 104 may log TCU component malfunction data identifying and/or detailing the component malfunction in the component log 128.

At index (D), in response to the TCU malfunction occurring and/or being logged, the TCU 104 may transmit at least a portion of one or more of the stored malfunction logs offboard the vehicle 102 for the diagnostic server 110. More particularly, the TCU 104 may publish at least a portion of the one or more logs to the data broker 108. As part of the publication, the TCU 104 may include a defined topic that describes the publication and/or malfunction type (e.g., TCU104/log/wireless) to which the diagnostic server 110 has previously subscribed. At index (E), the data broker 108 may transmit/publish an acknowledgment to the TCU 104 that indicates receipt of the publication.

At index (F), the data broker 108 may push the one or more published logged data to the diagnostic server 110. More particularly, upon receiving the publication from the TCU 104, the data broker 108 may identify that the diagnostic server 110 is a subscriber to the associated topic included in the publication from the TCU 104. In response, the data broker 108 may transmit the logged data to the diagnostic server 110. At index (G), the diagnostic server 110 may transmit or publish an acknowledgment to the data broker 108 that indicates proper receipt of the logged data. At index (H), the data broker 108 may transmit or publish an acknowledgment to the TCU 104 that indicates the subscribers, in this case the diagnostic server 110, received the publication from the TCU 104.

Upon transmitting/publishing data, the TCU 104 and/or the data broker 108 may wait for at least one acknowledgment that the data was properly received by the intended party or parties. In some embodiments, the TCU 104 may be configured to expect multiple acknowledgments, one from the data broker 108 indicative that the data was properly received by the data broker 108, and another from the data broker 108 indicative that the data was properly received by subscribers of the publication, or in this case the diagnostic server 110. If the TCU 104 and/or the data broker 108 fails to receive an expected acknowledgment within a predetermined time after making a transmission/publication, the TCU 104 and/or the data broker 108 may implement a retry mechanism and re-transmit/re-publish the data to the intended recipient. For example, if the TCU 104 fails to receive the acknowledgment at index (E), the TCU 104 may retry the transmission/publication.

In regards to data transmission/publication failures, the data broker 108 helps alleviate demand on the computational resources of the TCU 104. Beyond logging, the TCU 104 may function to provide communication between each of the controllers 116, and between the controllers 116 and a remote system 106 via the network 112. If the TCU 104 receives the acknowledgment at index (E), but the diagnostic server 110 is malfunctioning and unable to receive the published data, then the TCU 104 may rely on the retry mechanism of the data broker 108 rather than attempting to retry the transmission itself. In this way, the TCU 104 does not need to spend computational resources continuously storing and trying to retransmit the data to the diagnostic server 110, as the TCU 104 has confirmation that the data broker 108 is in possession of the data and will attempt to retransmit the data per its retry mechanism. This enables the TCU 104 to utilize its computational resources for other functions or continued logging, thereby improving the overall efficiency of the TCU 104 and the vehicle 102. Correspondingly, in some embodiments, responsive to receiving an acknowledgment that the logged data was received by the data broker 108, and before the logged T data is received by the diagnostic server 110, the logger 124 and/or TCU 104 may delete the transmitted logged data from the storage 22 of the TCU 104.

For the sake of brevity, the remaining exemplary embodiments illustrated in the process 200 omit transmission or publication of acknowledgments. However, it will be understood that in response to transmitting or publishing data, any one or more of the transmitting or publishing systems may expect to receive at least one response in the form of an acknowledgement. Any one or more of the transmitting or publishing systems may include a retry mechanism should such a response not be received within a predetermined time of transmitting or publishing data.

Index's (I)-(K) illustrate another embodiment. At index (I), the non-volatile memory dedicated to storing the logs of the TCU 104 may become full or nearly full. Upon this occurrence, and/or periodically, the logger 124 may automatically publish the stored TCU logs to the data broker 108 at index (J). The published logs may include one or more topics describing the contents of the logs. At index (K), the data broker 108 may identify the diagnostic server 110 as a subscriber to the one or more topics associated with the published logs, and may push the logs to the diagnostic server 110 based on the subscriptions.

Indexes (L)-(O) illustrate another embodiment in which TCU malfunction logs are requested from the TCU 104 by the diagnostic server 110 on demand. At index (L), the diagnostic server 110 may publish a log request to the data broker 108. In particular, a user may request one or more logs from the TCU 104 via the GUI of the diagnostic server 110. Thereafter, the data broker 108 may identify that the TCU 104 is a subscriber to such requests, such as based on a topic included in the request. At index (M), the data broker 108 may push the request to the TCU 104. In response to receiving the request, at index (N), the TCU 104 may publish the requested one or more logs to the data broker 108. At index (O), the data broker 108 may transmit the requested logs to the diagnostic server 110 to satisfy the request, such as based on one or more associated topics transmitted with the logs to which the diagnostic server 110 subscribes.

Indexes (P)-(S) illustrate an embodiment of the process 200 after logged TCU data is received by the diagnostic server 110. At index (P), the diagnostic server 110 may generate a fix for a TCU malfunction included in the logged TCU data. For example, the diagnostic server 110 may query the fix database 111 based on the TCU malfunction to identify a solution for the malfunction, such as a software patch, a firmware update, etc. Alternatively, or in the case that no predetermined solution is accessible, the diagnostic server 110 may be configured to dynamically generate a solution for the malfunction. Additionally, or alternatively, a user may generate or upload a solution utilizing a GUI of the diagnostic server 110.

At index (Q), the diagnostic server 110 may publish the selected fix to the data broker 108. At index (R), the data broker 108 may identify that the TCU 104 is a subscriber to an associated topic transmitted with the fix, and may push the fix to the TCU 104. At index (S), the TCU 104 may apply the fix, such as by installing the firmware update etc.

For example, the logged TCU data received by the diagnostic server 110 may identify a TCU component malfunction. Accordingly, responsive to receiving the TCU log data, the diagnostic server 110 may be configured to identify a fix, such a firmware update, from the fix database 111. In response to receiving the firmware update, the TCU 104 may be configured to install the firmware update on the TCU 104.

As another example, the logged TCU data received by the diagnostic server 110 may identify a cellular network malfunction, such as slower than expected cellular network connectivity. Accordingly, responsive to receiving the logged TCU data, the diagnostic server 110 may be configured to identify a fix in the form of computer instructions to utilize a different cellular network, the selection of which may be based on a geographic location of the vehicle 102 included received logged TCU data. In response to receiving the fix, the TCU 104 may be configured to utilize the different cellular network for better cellular network connectivity.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A vehicle comprising,
    a telematics control unit (TCU) configured to,
        periodically record in a log wireless activity data relating to an authentication, attachment, signaling, detachment, and handover procedure of the TCU to provide one or more remote vehicle services, and
        responsive to detecting a cellular malfunction from the logged data, wirelessly transmit at least a portion of the log that corresponds to the cellular malfunction offboard the vehicle for a remote diagnostic server; wherein
    the periodically recorded wireless activity data includes first data that relates to an authentication, attachment, signaling, detachment, or handover activity of the TCU corresponding to the cellular malfunction, and second data that relates to an authentication, attachment, signaling, detachment, or handover activity of the TCU that is not associated with the cellular malfunction,
    the TCU is further configured to record the wireless activity data in the log transmitted offboard the vehicle responsive to detecting the cellular malfunction as the wireless activity data is periodically collected by the TCU, and
    the log is a first log of the TCU, and the TCU is further configured to, responsive to a component malfunction of the TCU,
        record data indicative of the component malfunction in a second log of the TCU, and
        wirelessly transmit at least a portion of the first log and the second log offboard the vehicle for the remote diagnostic server.

2. The vehicle of claim 1, wherein the transmitted at least a portion of the log further includes data relating to operation of the TCU collected by the TCU after the cellular malfunction is detected.

3. The vehicle of claim 1, wherein the transmitted log includes the first data and not the second data, and the TCU is further configured to, responsive to detecting the cellular malfunction, discard the second data without transmitting the second data offboard the vehicle.

4. The vehicle of claim 1, wherein the component malfunction comprises a diagnostic trouble code, a firmware over-the-air update failure, an input-output fault, a global positioning fault, a message broker connection issue, or a memory read/write failure.

5. The vehicle of claim 1, wherein the TCU is further configured to, responsive to the component malfunction,
    identify data in the first log that is associated with a timestamp within a predefined time period immediately preceding the component malfunction, and
    wirelessly transmit the identified data offboard the vehicle for the remote diagnostic server.

6. The vehicle of claim 5, wherein the TCU is further configured to, responsive to the component malfunction, discard data in the first log that is not associated with a timestamp within the predefined time period immediately prior to the component malfunction, wherein the discarded data is not transmitted offboard the vehicle for the remote diagnostic server.

7. The vehicle of claim 1, wherein the TCU is further configured to,
    responsive to a log transmission failure, insert the at least a portion of the log in a cache for failed transmission log data, and
    responsive to a data size of the failed transmission log data in the cache exceeding a threshold, wirelessly retry transmitting the at least a portion of the log offboard the vehicle for the remote diagnostic server.

8. The vehicle of claim 1, wherein the cellular malfunction is slow cellular network connectivity, and the TCU is further configured to,
    responsive to receiving a fix corresponding to the log from the remote diagnostic server that defines instructions for the TCU to utilize a different cellular network, connect to the different cellular network.

9. The vehicle of claim 1, wherein the TCU is configured to wirelessly transmit the at least a portion of the log by being configured to wirelessly transmit the log and an associated topic offboard the vehicle to a data broker, and responsive to receiving the log, the data broker is configured to, responsive to identifying the remote diagnostic server as a subscriber to the associated topic, transmit the log to the remote diagnostic server.

10. A method comprising,
    by a telematics control unit (TCU) of a vehicle,
        periodically recording in a log wireless activity data relating to an authentication, attachment, signaling, detachment, and handover procedure of the TCU to provide one or more remote vehicle services, responsive to detecting a cellular malfunction from the log, wirelessly transmitting at least a portion of the log that corresponds to the cellular malfunction offboard the vehicle for a remote diagnostic server; wherein the log is a first log of the TCU, and further comprising responsive to a component malfunction of the TCU, logging data indicative of the component malfunction in a second log, and wirelessly transmitting at least a portion of the first log and the second log offboard the vehicle for the remote diagnostic server.

11. The method of claim 10, wherein the component malfunction includes a diagnostic trouble code, a firmware over-the-air update failure, an input-output fault, a global positioning fault, a message broker connection issues, or a memory read/write failure.

12. The method of claim 10, wherein the cellular malfunction is slow cellular network connectivity, and further comprising, responsive to receiving a fix corresponding to the log from the remote diagnostic server that defines instructions for the TCU to utilize a different cellular network, connecting to the different cellular network.

13. The method of claim 10, wherein transmitting the at least a portion of the log offboard the vehicle comprises transmitting the log and an associated topic offboard the vehicle to a data broker, wherein responsive to receiving the log, the data broker is configured to, responsive to identifying the remote diagnostic server as a subscriber to the topic, transmit the log to the remote diagnostic server.

14. The method of claim 13, further comprising, responsive to receiving an acknowledgement from the data broker before the log is received by the remote diagnostic server, deleting contents of the log from the TCU.

15. The method of claim 10, further comprising, responsive to a transmission failure, inserting the at least a portion of the log in a cache for failed transmission log data, and responsive to a data size of the failed transmission log data in the cache exceeding a threshold, wirelessly retry transmitting the at least a portion of the log offboard the vehicle for the remote diagnostic server.

* * * * *